United States Patent

Davis, Jr.

[15] 3,641,256

[45] Feb. 8, 1972

[54] BLACK AND WHITE TELEVISION CAMERA EXPANDABLE TO A COLOR TELEVISION CAMERA

[72] Inventor: Gary F. Davis, Jr., R.R. #3, Columbus, Ind. 47201

[22] Filed: Sept. 17, 1970

[21] Appl. No.: 72,968

[52] U.S. Cl. ................178/5.4 ST, 178/5.4 CF, 178/5.4 SY, 178/7.2

[51] Int. Cl...........................................H04r 9/06, H04r 9/34

[58] Field of Search......................178/5.4 R, 5.4 ST, 5.4 CF, 178/5.4 SY, 5.2 R, 5.2 D, 7.2, 7.1

[56] References Cited

UNITED STATES PATENTS

| | | | |
|---|---|---|---|
| 2,644,032 | 6/1953 | Maher et al. | 178/5.4 CF |
| 2,734,937 | 2/1956 | Beste | 178/5.2 R |

OTHER PUBLICATIONS

"Color Daptor" Radio-Electronics pp. 97–100 Feb. 1956 178–5.4 R

"Projection Color TV with a Color wheel" Radio & TV News pp 64–65, 135 Oct. 1955 178–5.4 R

*Primary Examiner*—Robert L. Richardson
*Attorney*—Hood, Gust, Irish, Lundy & Coffey

[57] ABSTRACT

In a television camera comprising a vidicon tube having a cathode and grid, a vertical yoke, and a horizontal yoke, the improvement comprising a color wheel assembly including a color wheel having a plurality of peripherally spaced-apart transparent color filter segments, the wheel being positioned and arranged relative to the vidicon tube to change the spectral response of its image pickup into an ordered sequence of colors, means for driving the wheel at a predetermined constant speed, and switch means responsive to movement of the wheel to provide a predetermined number of pulses per revolution of the wheel. First circuit means is provided for processing the pulses as well as color synch pulses. The camera includes blank and synch circuitry, and the improvement also comprises a multivibrator including alternately saturated collector circuits, one of the collector circuits being connected to the horizontal yoke to provide horizontal pulses thereto, the other of the collector circuits being connected to the blank and synch circuitry to provide blanking pulses thereto. The blank and synch circuitry includes two NPN transistor stages, the first stage of which produces positive-going blanking pulses for application to the cathode of the vidicon tube and the second stage of which produces negative-going pulses for application to the grid of the vidicon tube, whereby the tube is blank during retrace by composite positive and negative pulses.

22 Claims, 2 Drawing Figures

Figure 1:
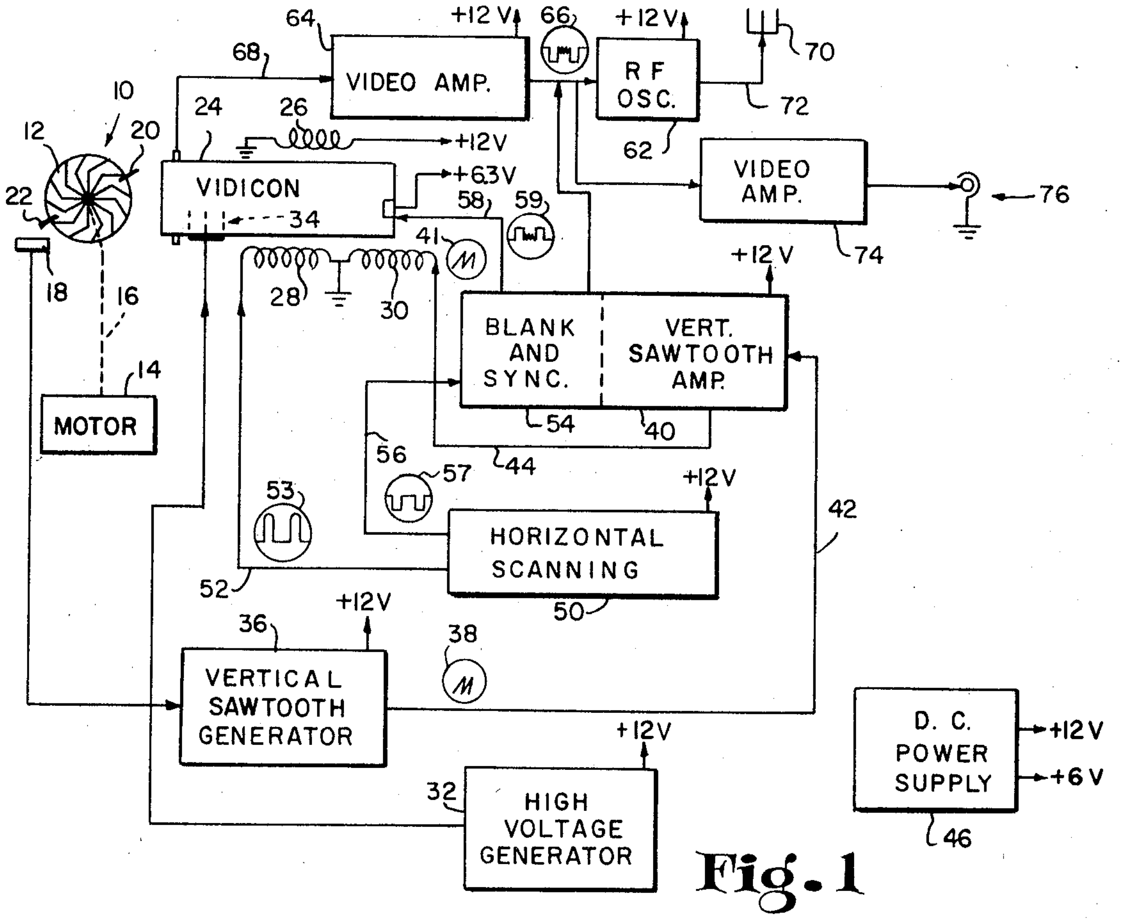

INVENTOR.
GARY F. DAVIS, JR.
BY
Hood, Gust, Irish & Lundy
ATTORNEYS

BLACK AND WHITE TELEVISION CAMERA EXPANDABLE TO A COLOR TELEVISION CAMERA

It is a primary object of my present invention to provide a television camera which is rather simple in structure, but which is effective for the purpose intended. Further, it is a primary object of my invention to provide such a camera which can be readily expanded, by the addition of a color wheel assembly, to a color television camera.

The basic concept of a field sequential color system was worked out by Dr. Peter Goldmark many years ago and became known as the CBS System. Such a system produced or transmitted one color per field or per frame. It is my concept to provide a camera which generates two complete ordered sequences of color per field or per frame. Thus, in my color camera, each field consists of two complete ordered sequences of color consisting of a red, blue and green sequence followed by another red, blue and green sequence.

Particularly, my invention resides in a television camera comprising a vidicon tube having a cathode and grid, a vertical yoke, and a horizontal yoke. My color camera comprises a color wheel assembly including a color wheel having a plurality of peripherally spaced-apart transparent color filter segments, the wheel being positioned and arranged relative to the vidicon tube to change the spectral response of its image pickup into an ordered sequence of colors. The wheel is driven at a predetermined constant speed, and switch means responsive to movement of the wheel to provide a predetermined number of pulses per revolution of the wheel is provided. Circuit means are provided for processing the pulses to provide vertical synch pulses for the camera, the circuit means providing an operative connection between the switch means and the vertical yoke. It is my concept, therefore, to provide a color television camera arranged so that its vertical synch pulse, or vertical retrace pulse as it is sometimes called, actually constitutes the color synch pulse information.

My basic camera, which may be either a black and white camera or a color camera, preferably includes a multivibrator including alternately saturated collector circuits, one of the collector circuits being connected to the horizontal yoke to provide horizontal pulses thereto, the other collector circuit being connected to the blank and synch circuitry of the camera to provide blanking pulses thereto. In this description and in the claims appended hereto, the terms "alternately saturated collector circuits" is intended to refer to the circuits normally associated with the collectors of the transistors comprising the multivibrator, which collectors are alternately conductive and nonconductive because of the switching nature of the multivibrator.

The multivibrator which I prefer to use is a collector-coupled multivibrator including collector-coupled NPN-transistors, the saturation levels of which are such that positive-going pulses are applied thereby to the horizontal yoke and negative-going pulses are applied thereby to the blank and synch circuitry, each negative-going pulse occurring at the same time that a positive-going pulse occurs.

I prefer to use what is referred to as composite blanking. In my preferred camera circuitry, the blank and synch circuitry includes a first NPN-transistor stage and a second NPN-transistor stage, the collector circuit of the first stage being connected to the base circuit of the second stage, with the negative-going pulses provided by the aforesaid multivibrator being applied to the base circuitry of the first stage to produce positive-going blanking pulses on its collector circuit for application to the cathode of the vidicon tube. The second stage responds to the last-said positive-going pulses to produce negative-going pulses for application to the grid of the vidicon tube. Thus, the tube is blanked during retrace by composite positive and negative pulses.

Other objects and features of my present invention will become apparent as this description progresses.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 2:
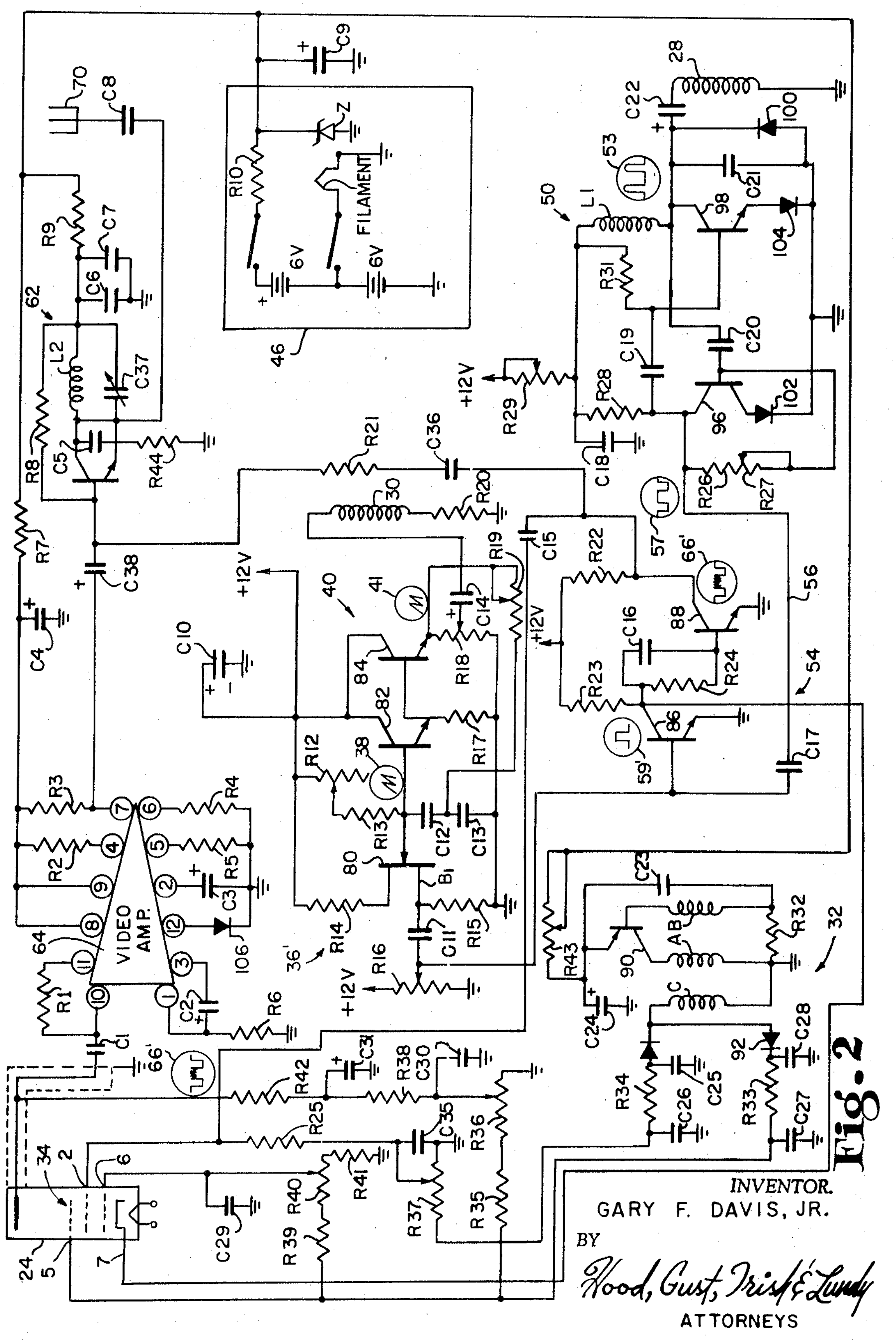

In the drawings:

FIG. 1 is a block diagram of my basic camera expanded to include a color wheel assembly; and FIG. 2 is a schematic of one embodiment of my basic camera.

Referring now to FIG. 1, it will be seen that I have shown, in block diagram form, a colored television camera comprising a wheel assembly 10 including a color wheel 12, motor 14 and a driving connection indicated at 16 between the motor and the wheel. Adjacent the color wheel 12, I place a magnetic switch 18. This switch 18 is operated by a pair of magnets 20, 22 mounted at diametrically opposite points on the periphery of the wheel 12.

The wheel 12 is conventionally axially arranged relative to the vidicon tube 24 so that each segment of the wheel moves in front of and changes the spectral response of the image pickup of the vidicon tube. The manner in which a color wheel may be used in conjunction with a vidicon tube is generally known. In FIG. 1, I show a focus coil 26, horizontal yoke coil 28, vertical yoke coil 30, a high-voltage generator 32 and grids 34 conventionally arranged relative to the vidicon tube 24.

In my preferred system, the wheel assembly 10 includes the wheel 12 having 12 transparent colored filter segments arranged to change the spectral response of the image pickup into a sequence of red, blue and green in that order. By changing this spectral response and then adding the three primary colors in rapid succession, the human eye tends to restore the original color components in an additive process which approaches standard color vision.

I prefer to drive the wheel 12 at a constant speed of 30 revolutions per second. Thus, for each 180° rotation of the wheel 12, there are two complete ordered color sequences consisting of a red, blue and green sequence followed by another red, blue and green sequence. This system has a field rate of 60 frames per second and the frame time is 16.7 milliseconds. Each colored filter segment is in front of the vidicon, therefore, 2.78 milliseconds. Just prior to the red sequence, one of the magnets 20, 22 triggers the magnetic switch 18 which is connected to a vertical sawtooth generator 36 arranged to generate a sawtooth signal, such as indicated at 38, which is processed to become the vertical scan signal. Thus, the switch 18 is operated 60 times per second by the magnets 20, 22 to generate the sawtooth necessary for the vertical scan circuitry of the camera, with each sawtooth representing 16.7 milliseconds of time. The sawtooth signal 38 is fed to a vertical sawtooth amplifier 40 by the line indicated at 42 and from the amplifier 40 to the vertical yoke 30 by the line indicated at 44. The waveform of the signal applied to the yoke 30 is shown at 41. The pulse from the magnetic switch 18 may be conventionally processed by a series of capacitors in the generator 36 to generate the basic sawtooth form and then subsequently conventionally processed by the amplifier 40 to drive the vertical yoke 30.

The vertical pulses, therefore, coincide with the color synch pulses since each vertical retrace pulse or each vertical pulse constitutes the start of a color sequence of six 2.78-millisecond periods, i.e., a red segment, a blue segment, a green segment, another red segment, another blue segment, and another green segment. At the end of each 16.7-millisecond color sequence, I feed in another vertical pulse which serves as a color synch pulse to maintain the sequential system in the associated receiver to keep it in color synch. This color synch pulse prevents color contamination, i.e., having a particular filter segment keyed in with the wrong color grid on the receiver.

It is my concept, therefore, to provide a colored television camera arranged so that its vertical synch pulse, or vertical retrace pulse as it is sometimes called, actually constitutes the color synch pulse information.

In conventional color wheel television cameras, the wheels have been driven by synchronous motors which were synchronized with the vertical synch generator output of the camera. In my system, the wheel 12 is driven at a constant speed and the magnets 20, 22 and the magnetic switch 18 provide vertical synch pulses which are in synchronism with the wheel 12. It is important to note that I may use two switches disposed at diametrically opposite positions about the periphery of the wheel with one magnet on the wheel to provide the desired pulse rate or, for that matter, I may use any number of magnetic switches and any number of magnets to provide the desired pulse rate.

Further, it will be appreciated that I may use any switch means responsive to rotation to provide pulses. For instance, instead of the magnetic switch 18 and magnets 20, 22, I may use a light source and a light-actuated semiconductor device with a pair of apertures disposed at diametrically opposite points on the outer periphery of the wheel 12 and with the outer periphery of the wheel disposed between the source and semiconductor device. In this case, the semiconductor device would receive a flash of light to provide a pulse when one of said apertures moves between the source and device. Further, I may use magnetic pickup means including at least one coil adjacent the periphery of the wheel 12 and at least one magnet in the periphery of the wheel. My colored television camera, therefore, comprises switch means responsive to movement of a color wheel to provide color synch pulses as well as vertical scan pulses.

It will be appreciated that my camera generates two complete color pictures per field, or per frame. Thus, it is not a pure field sequential system which transmits one color per field or per frame. My system is compatible with a conventional television receiver from the standpoint that a conventional television receiver will be able to pick up the black and white version of any picture transmitted by my camera. The scan rates are not altered because my basic camera is a random scan system and thereby not locked with a 30-cycle interlace system as in a pure field sequential system.

In FIG. 1, I show a direct current power supply 46 having a 6-volt output and a 12-volt output. I prefer to provide this by placing two 6-volt batteries wired in series, providing a tap for the 6-volt source for use with the vidicon filament as shown in FIG. 2. The two batteries in series, of course, provide 12 volts which can be regulated by a conventional zener diode down to 10 to 11 volts, depending upon which value zener diode I choose to use. A zener diode is not absolutely necessary if the direct current is provided by batteries, but a zener diode is advisable if the direct current is produced by rectifying alternating current. In FIG. 2 I show a zener regulation circuit comprising zener diode Z, resistor R10 and capacitor C9.

The power supply 46 supplies all of the circuits in my camera with each section of the camera operating at a slightly different voltage to provide some decoupling from stage to stage; for instance, to prevent horizontal pulses from showing up in the vertical circuitry. I prefer to decouple locally at each individual stage.

In FIG. 1, I show horizontal scanning circuitry 50, one output of which is connected to the horizontal yoke 28 by means of a line 52 and another output of which is connected to a blank and synch circuit 54 by the line 56. The type of waveform on the line 52 is shown at 53 and the type of waveform on the line 56 is shown at 57. The manner in which I provide these waveforms will be discussed in conjunction with FIG. 2. The blank and synch circuit 54 is connected to the vidicon tube 24 in a conventional manner and by a line indicated at 58. The type of signal provided by the blank and synch circuit is indicated at 59.

The blank and synch circuit 54 is also connected by a line 60 to the input of a RF-oscillator 62. Conventionally, a video amplifier 64 is connected to the input of the RF-oscillator 62, the video amplifier being connected to the vidicon tube 24 by line indicated at 68. The type of signal provided to the RF-oscillator 62 by the video amplifier 64 and the blank and synch circuit 54 is indicated at 66. I show an antenna 70 connected to the output of the RF-oscillator 62 by a line indicated at 72.

I prefer to use what is referred to as composite blanking for the vidicon. Conventionally, blanking serves the purpose of extinguishing the beam during retrace. After each horizontal line and at the end of each frame, the beam is extinguished by the blanking signal. Composite blanking mixes the two functions together and, in my camera which operates on a 12-volt direct current source, I provide composite blanking of 24 volts by driving the cathode positive at the same time that the grid is driven negative, thereby to blank the entire tube. The specific manner in which I use composite blanking will be discussed in greater detail in conjunction with FIG. 2.

The synch pulse taken from the blank and synch circuit 54 is a negative-going pulse as shown at 66, this pulse forming a negative blanking function and also the negative-going synch function which is fed directly into the RF-oscillator 62. Of course, the RF-oscillator 62 produces the RF signal which is modulated by the video amplifier 64. The particular video amplifier which I prefer to use is shown and discussed in conjunction with FIG. 2.

With the RF-oscillator 62 and the antenna 70, my camera will function as a transmitter. Additionally, I show a video amplifier 74 which may be used directly to drive a video tape recorder or some other type of television transmitter, the output of the amplifier 74 being shown connected to a connector 76 which may be the input connector of a video tape recorder.

Referring now to FIG. 2, it will be seen that I have shown a detailed schematic of a portable television camera which uses the advantageous features of my present invention, the camera of FIG. 2 being a black and white camera in that the color wheel assembly 10 is not involved. Since the color wheel assembly 10 is not used, a vertical sawtooth generator 36', which, illustratively, is a unijunction transistor oscillator, is used to generate the sawtooth waveform 38. Particularly, the unijunction transistor oscillator 36' replaces the magnetic switch 18, magnets 20 and 22 and the vertical sawtooth generator 36 discussed in conjunction with FIG. 1. The sawtooth waveform 38 is amplified by an amplifier 40 to provide the waveform 41 as discussed in conjunction with FIG. 1.

The unijunction transistor oscillator 36' includes a unijunction transistor 80 arranged as illustrated with resistors R12, R13, R14, R15, and capacitors C11, C12, C13. It will be seen that one base electrode B1 of the transistor 80 is connected to one side of the capacitor C11, the other side of which is connected to the wiper of a variable resistor R16. This variable resistor R16, one end of which is connected to positive 12-volt source and the other end of which is connected to ground serves as means for setting up the blanking signal. The two resistors indicated at R12 and R13 are components of a variable resistor means providing the conventional vertical hold function.

The amplifier 40 includes a pair of NPN-transistors 82, 84 arranged as illustrated with resistors R17, R18, R19 and capacitors C10, C14. The yoke 30 is connected to the wiper of variable resistor R18 through the capacitor C14.

The oscillator 36' produces a sawtooth of approximately 12-volts amplitude at the emitter of unijunction transistor 80, i.e., on the capacitor C12. This sawtooth is then fed to the amplifier 40 and particularly to the first emitter-follower stage (transistor 82) of the amplifier which, in turn, drives the second emitter-follower stage (transistor 84) of the amplifier to accomplish the necessary impedance conversion to drive the vertical yoke 30 which is, for instance, a 160-ohm yoke. Resistor R20 may be placed in series with yoke 30 to raise its total impedance to prevent loading of the second emitter follower of amplifier 40. The resistor R20 is advisable to maintain the sawtooth in the yoke 30. Adjustable resistor R19 feeds part of the sawtooth back to the relatively higher impedance point between capacitors C12 and C13 to provide some negative feedback adjustment for linearity correction from camera to camera. By adjusting the unijunction relaxation oscillator 36′ time with resistors R12 and R13, I can control the vertical frequency. The correction provided by resistors R12 and R13 compensates for variations in performance of unijunction transistors, the intrinsic standoff ratio of which usually varies from transistor to transistor. The capacitor C10 decouples the vertical pulse from the positive 12-volt supply line to keep parabolic waveforms from appearing on the supply line.

Referring now to the blank and synch circuit 54, it will be seen that it includes a pair of NPN-transistors 86, 88, resistors R22, R23, R24, and capacitors C16, C17. As discussed in conjunction with FIG. 1, blanking pulses, indicated at 59′, are positive-going pulses while the synch pulses, indicated at 66′, are negative-going pulses. The synch pulses are taken from the second stage of the blank and synch circuit as shown and are fed through a capacitor C36 and a resistor R21 to the RF-oscillator 62. The synch pulses are also fed through a capacitor C15 to the grid connector 2 of the vidicon 24. The positive-going blanking pulses 59′ are fed to the cathode connector pins 7 of the vidicon tube 24.

Conventionally, there is an electromagnetic focusing system including a focus coil wound around the tube 24 and connected directly to the positive 12-volt source.

Referring still to FIG. 2, my high-voltage generator 32 comprises a 25-kilohertz oscillator which produces a 300-volt positive direct current potential through a diode network and, at the same time, a negative 300-volt direct current potential through the opposite diode network. The high-voltage generator, which is basically an Armstrong type of oscillator, includes a PNP-transistor 90, the emitter electrode of which is connected through a variable resistor R43 to the positive 12-volt output of the power supply 46. The base of transistor 90 is connected to ground through a coil B and a series resistor R32; the collector of the transistor is connected to ground through a coil A; and the emitter of the transistor is isolated from ground by capacitors C23, C24. A coil C is wound around the coil A, the coil C having many more turns than the coil A, to generate a higher voltage sine wave of approximately 300 volts. The coil A generates a pulse which is picked up by the coil B to increase the current flowing to coil A, and, in turn, through B until the two coils A and B have reached the point of saturation, at which point the current level begins to fall. As the current level falls, the current level in B gets smaller and then the current level in coil A gets smaller until the current level in both coils drops to its starting level. This cycling of current in coils A and B produces the sine wave in coil C.

Variable resistor R43 serves as a means for controlling the amount of voltage potential at the output of the high-voltage generator 32 itself. This high-voltage potential is decoupled by capacitors C23 and C24 which prevent the 25-kilohertz pulse from appearing on the power supply 46.

The positive sine wave appearing on the coil C is applied through a diode 92 and resistor R33 to the accelerating grid connector pin 5, and, through an electrostatic focusing control (resistor R39 and variable resistor R40) to the focusing grid connector pin 6. The target of the vidicon tube 24, i.e., the pickup point, is fed the positive direct current potential through the vidicon load resistor R42, i.e., the resistor across which the video signal is generated from the vidicon itself. Resistor R38 and capacitors C30 and C31 provide filtering and bypass functions effectively to remove any remnant of transient spikes or transient pulses from the 25-kilohertz signal remaining at that point. The value of the direct current potential is determined by values of resistors R35, R36, R38 and R42.

Referring still to FIG. 2, it will be seen that my preferred horizontal scanning circuit 50 is a multivibrator including a pair of NPN-transistors 96, 98, the multivibrator serving both as a horizontal pulse generator and as a blanking pulse generator. Specifically, the horizontal scanning circuit 50 of the camera provides positive-going pulses 53 directly to drive the horizontal yoke 28 and negative-going pulses 57 to drive the blank and synch circuit 54.

The multivibrator of the horizontal scanning circuit 50 is stable from 2 to 24 or 25 volts or so. It is basically a conventional collector-coupled multivibrator except that an inductor L1 is placed in one half of the multivibrator in series with its collector load to form a part of that collector load. It will be seen that the inductor L1 is a load to the collector of the transistor 98. When the transistor 98 is saturated to the point that there is cutoff, a 40-volt positive-going pulse is generated by the autotransformer action in the inductor L1. This 40-volt pulse is then applied to the horizontal yoke 28. Because of the inductive reactance of the yoke 28 at the line frequency of 15,750 cycles per second, it is necessary to feed such a pulse into the yoke to get a sawtooth of current through its windings. A diode 100 from the collector of the transistor 98 to ground serves as a conventional damper diode to clamp out or to damp out any oscillations that would be generated by applying such a pulse through an inductor.

As the 40-volt pulse moves positive, it changes the state of the multivibrator through the coupling capacitor C20 to move the inductor L1 from saturation to cutoff and to drive the transistor 96 into saturation. As the transistor 96 is driven into saturation, it generates a negative-going pulse of 10-volt potential which forms the horizontal blanking pulses 57, each negative-going pulse 57 occurring at exactly the same time that a positive-going pulse 53 of 40 volts occurs on the collector of the transistor 98. The amplitude of these pulses is controlled by a variable resistor R29 which serves as the width control. The diodes 102, 104 in the emitter circuits of the transistors 96, 98 stabilize the multivibrator so that it is basically stable over its entire range. The only other control on the multivibrator is a horizontal frequency control, commonly called a horizontal hold control, represented by variable resistor R27.

The horizontal blanking pulses 57 are fed to the first stage of the blank and synch circuit 54, this stage being biased from a 2-megohm resistor R16 from the 12-volt supply to ground and, therefore, normally held in saturation. The negative-going blanking pulses 57 are coupled through capacitor C17 to bring the transistor 86 out of saturation and into cutoff driving its collector positive. The positive pulses produced in this manner, i.e., on the collector of the transistor 86, are the blanking pulses referred to previously as pulses 59′. These pulses 59′ are fed to the cathode connector pin 7 of the vidicon tube 24 to blank the tube during retrace. Each pulse 59′ arrives during retrace or at the time that the horizontal scanning line is returning to the left side of the camera tube.

It will be appreciated that each pulse 59′ is also available on the collector side of resistor R23 to be coupled through the resistor R24 to the base of the transistor 88 to generate each negative-going pulse referred to previously as 66′ which is also fed into the grid of the vidicon tube 24 to provide a negative-going blanking pulse to accomplish the additive blanking or composite blanking discussed previously. These negative-going pulses 66, as discussed previously, are provided to the RF-oscillator 62 to be transmitted as synch pulses.

Analyzing further the circuitry of FIG. 2, it will be appreciated that the vertical component of the blanking and synch signal comes from the base $B_1$ of the unijunction transistor 80. Each pulse, coming from this base $B_1$ moves positive and its time constant is defined by capacitor C11, resistor R15 and variable resistor R16, the time constant allowing preferably for a small amount of overshoot in the negative-going area of the vertical retrace pulse. This allows me to establish a variable time for the vertical blanking width allowing the blanking transistor 86 to be switched from saturation into cutoff. By adjusting the variable resistor R16, I can control the vertical blanking interval. Adjustments at this point will not affect the horizontal blanking interval which is fixed by time constants to a value of 11 microseconds. During the horizontal blanking interval, the signal on the resistor R23 is a composite blanking pulse consisting of both horizontal and vertical pulses mixed together.

The vidicon signal or the vidicon output is taken directly off the vidicon cathode through the capacitor C1 into the video amplifier 64. The video amplifier 64 may be a conventional and commercially available wide band amplifier operable from, for instance, 30 Hz. to 8 MHz. In my developmental model, the circuitry for which is shown in FIG. 2, I successfully used a RCA linear integrated circuit variety pack model KD2115 modified as illustrated with resistors R1, R2, R3, R4, R5, R6 and capacitors C1, C2, C3 and a diode 106. The numbered terminals 1–12 on the amplifier 64 in FIG. 2 correspond, respectively, to the numbered terminals on the pack model KD2115.

The video signal is processed in the video amplifier 64 to drive the RF-oscillator 62. The RF-oscillator 62 is conventional and need not be discussed, in great detail, in this description. The oscillator 62 may be adjusted to a VHF television channel which is vacant in the locality, the adjustment being made with the variable capacitor C37. The two capacitors C6 and C7 perform different type of bypassing functions, the capacitor C6 bypassing in conjunction with the resistor R9 to decouple any remaining vertical pulse from the oscillator which would affect the picture in a shading modulation, i.e., where there may be a darker picture at the top and the bottom of the screen, and the capacitor C7 bypassing the RF signal to allow the oscillator to work. The oscillator 62 is basically just a modulated oscillator or a collector to emitter coupled type of conventional VHF oscillator. The oscillator 62, of course, drives the antenna 70.

The purpose of the illustrated resistor R25 is to isolate the negative composite blanking from the beam control and its bypassing capacitor C35.

The functional aspects of the circuitry of FIGS. 1 and 2 have now been fully described. As a matter of convenience for those interested in constructing cameras in accordance with my present invention, I shall provide a listing of passive circuit components and their values as they appear in FIG. 2.

| | |
|---|---|
| Capacitors: | |
| C1 | 0.03 microfarad |
| C2 | 5 microfarad |
| C3 | 5 microfarad |
| C4 | 250 microfarad |
| C5 | 5 picofarad |
| C6 | 250 microfarad |
| C7 | 0.02 microfarad |
| C8 | 5 picofarad |
| C9 | 1000 microfarad |
| C10 | 1000 microfarad |
| C11 | 0.22 microfarad |
| C12 | 0.1 microfarad |
| C13 | 0.1 microfarad |
| C14 | 80 microfarad |
| C15 | 390 picofarad |
| C16 | 390 picofarad |
| C17 | 0.002 microfarad |
| C18 | 100 microfarad |
| C19 | 0.006 microfarad |
| C20 | 0.001 microfarad |
| C21 | 0.002 microfarad |
| C22 | 4 microfarad |
| C23 | 0.22 microfarad |
| C24 | 4 microfarad |
| C25 | 0.02 microfarad |
| C26 | 0.02 microfarad |
| C27 | 0.03 microfarad |
| C28 | 0.03 microfarad |
| C29 | 0.1 microfarad |
| C30 | 0.1 microfarad |
| C31 | 5 microfarad |
| C35 | 0.22 microfarad |
| C36 | 0.1 microfarad |
| C37 | 5–100 picofarad |
| C38 | approximately 30 microfarad |
| Resistors: | |
| R1 | 10 kilohm |
| R2 | 150 ohm |
| R3 | 150 ohm |
| R4 | 15 ohm |
| R5 | 15 ohm |
| R6 | 4.7 kilohm |
| R7 | 20 ohm |
| R8 | 33 kilohm |
| R9 | 3.3 kilohm |
| R10 | 33 ohm |
| R12 | 100 kilohm |
| R13 | 150 kilohm |
| R14 | 150 ohm |
| R15 | 470 ohm |
| R16 | 2 megohm |
| R17 | 100 kilohm |
| R18 | 500 ohm |
| R19 | 50 kilohm |
| R20 | 150 ohm |
| R22 | 12 kilohm |
| R23 | 12 kilohm |
| R24 | 470 kilohm |
| R25 | 270 kilohm |
| R26 | 15 kilohm |
| R27 | 50 kilohm |
| R28 | 1 kilohm |
| R29 | 300–500 ohm |
| R31 | 2.7 kilohm |
| R32 | 10 kilohm |
| R33 | 22 kilohm |
| R34 | 2.2 megohm |
| R35 | 2.2 megohm |
| R36 | 1 megohm |
| R37 | 2 megohm |
| R38 | 100 kilohm |
| R39 | 1 megohm |
| R40 | 2.5 megohm |
| R41 | 1 megohm |
| R42 | 56 kilohm |
| R43 | 5 kilohm |
| Inductors: | |
| L1 | 15 microhenry |
| L2 | approximately 1 microhenry |
| Coils A | 0.1 ohm max. |
| Coil B | 0.55 ohm max. |
| Coil C | 0.15 ohm max. |

In building the camera shown in FIG. 2, it was one of my objects to keep the cost of the components relatively low. Another object was to use conventional, commercially available and inexpensive integrated circuits and transistors. In addition to the wide band amplifier model KD2115 discussed previously, the transistors 82, 84, 86, 88, 96 and 98 and the transistors for the video amplifier 74 (FIG. 1) were obtained from a RCA linear integrated circuit variety pack KD–2117.

What is claimed is:

1. In a television camera comprising a vidicon tube having a cathode and grid, a vertical yoke, and a horizontal yoke, the improvement comprising a color wheel assembly including a color wheel having a plurality of peripherally spaced-apart transparent color filter segments, said wheel being positioned and arranged relative to said vidicon tube to change the spectral response of its image pickup into an ordered sequence of colors, means for driving said wheel at a predetermined constant speed, and switch means responsive to movement of said wheel to provide a predetermined number of pulses per revolution of said wheel, and first circuit means for processing said pulses to provide vertical synch pulses, said circuit means providing an operative connection between said switch means and said vertical yoke.

2. The improvement of claim 1 in which said first circuit means includes a sawtooth generator and amplifier.

3. The improvement of claim 1 in which said wheel includes 12 of said segments of generally equal peripheral extent to provide two complete ordered sequences of color per revolution of said wheel consisting of a red, blue and green sequence followed by another red, blue and green sequence.

4. The improvement of claim 3 in which said wheel is driven at 30 revolutions per second, in which said switch means is positioned and arranged to provide 60 of said pulses per second at a constant pulse, repetition rate, and said switch means further being positioned and arranged to provide one of said pulses just prior to the red sequence of each of said two complete ordered sequences, whereby each of said pulses serves as a color synch pulse.

5. The improvement of claim 4 in which said switch means includes magnetic means mounted on the periphery of said wheel and means responsive to said magnetic means disposed adjacent the periphery of said wheel.

6. The invention of claim 5 in which said first circuit means includes a sawtooth generator and amplifier.

7. The invention of claim 4 in which said camera includes blank and synch circuitry, and in which the improvement comprises a multivibrator including alternately saturated collector circuits, one of said collector circuits being connected to said horizontal yoke to provide horizontal pulses thereto, the other of said collector circuits being connected to said blank and synch circuitry to provide blanking pulses thereto.

8. The invention of claim 7 in which said multivibrator includes, as part of the load for said one collector circuit, an inductor effective to generate said horizontal pulses by autotransformer action when said multivibrator changes state.

9. The improvement of claim 1 in which said switch means includes magnetic means mounted on the periphery of said wheel and means responsive to said magnetic means disposed adjacent the periphery of said wheel.

10. The invention of claim 1 in which said camera includes blank and synch circuitry, and in which the improvement comprises a multivibrator including alternately saturated collector circuits, one of said collector circuits being connected to said horizontal yoke to provide horizontal pulses thereto, the other of said collector circuits being connected to said blank and synch circuitry to provide blanking pulses thereto.

11. The improvement of claim 10 in which said multivibrator includes, as part of the load for said one collector circuit, an inductor effective to generate said horizontal pulses by autotransformer action when said multivibrator changes state.

12. The improvement of claim 11 in which said multivibrator is a collector-coupled multivibrator including collector-coupled NPN-transistors, the saturation levels of which are such that positive-going pulses are applied thereby to said horizontal yoke and negative-going pulses are applied thereby to said blank and synch circuitry, each negative-going pulse occurring at the same time that a positive-going pulse occurs.

13. The invention of claim 12 in which said blank and synch circuitry includes a first NPN-transistor stage and a second NPN-transistor stage, the collector circuit of the first stage being connected to the base circuit of the second stage, said negative-going pulses provided by said multivibrator being applied to the base circuitry of said first stage to produce positive-going blanking pulses on its collector circuit for application to the cathode of said vidicon tube, said second stage responding to the last-said positive-going pulses to provide negative-going pulses for application to the grid of said vidicon tube, whereby said tube is blanked during retrace by composite positive and negative pulses.

14. In a television camera comprising a vidicon tube having a cathode and grid, a vertical yoke, a horizontal yoke and blank and synch circuitry, the improvement comprising a multivibrator including alternately saturated collector circuits, one of said collector circuits being connected to said horizontal yoke to provide horizontal pulses thereto and the other of said collector circuits being connected to said blank and synch circuitry to provide blanking pulses thereto.

15. The improvement of claim 14 in which said multivibrator includes, as part of the load for said one collector circuit, an inductor effective to generate said horizontal pulses by autotransformer action when said multivibrator changes state.

16. The improvement of claim 15 in which said multivibrator is a collector-coupled multivibrator including collector-coupled NPN-transistors, the saturation levels of which are such that positive-going pulses are applied thereby to said horizontal yoke and negative-going pulses are applied thereby to said blank and synch circuitry, each negative-going pulse occurring at the same time that a positive-going pulse occurs.

17. The improvement of claim 16 in which said blank and synch circuitry includes a first NPN-transistor stage and a second NPN-transistor stage, the collector circuit of the first stage being connected to the base circuit of the second stage, said negative-going pulses provided by said multivibrator being applied to the base circuitry of said first stage to produce positive-going blanking pulses on its collector circuit for application to the cathode of said vidicon tube, said second stage responding to the last-said positive-going pulses to provide negative-going pulses for application to the grid of said vidicon tube, whereby said tube is blanked during retrace by composite positive and negative pulses.

18. The invention of claim 17 in which the improvement comprises an antenna, an RF oscillator driving said antenna, a video amplifier connecting the output of said vidicon tube to said oscillator, and means for connecting said second stage of said blank and synch circuitry to said oscillator whereby the last-said negative-going pulses are provided to synch said oscillator.

19. The invention of claim 17 in which the improvement comprises an unijunction transistor oscillator for initiating vertical synch pulses and an amplifier for connecting the last-said oscillator to said vertical yoke.

20. The invention of claim 14 in which the improvement further comprises a color wheel assembly including a color wheel having a plurality of peripherally spaced-apart transparent color filter segments, said wheel being positioned and arranged relative to said vidicon tube to change the spectral response of its image pickup into an ordered sequence of colors, means for driving said wheel at a predetermined constant speed, and switch means responsive to movement of said wheel to provide a predetermined number of pulses per revolution of said wheel, and first circuit means for processing said pulses to provide vertical synch pulses, said circuit means providing an operative connection between said switch means and said vertical yoke.

21. The invention of claim 20 in which said wheel includes 12 of said segments of generally equal peripheral extent to provide two complete ordered sequences of color per revolution of said wheel consisting of a red, blue and green sequence followed by another red, blue and green sequence.

22. The invention of claim 21 in which said wheel is driven at 30 revolutions per second, in which said switch means is positioned and arranged to provide 60 of said pulses per second at a constant pulse repetition rate, and said switch means further being positioned and arranged to provide one of said pulses just prior to the red sequence of each of said two complete ordered sequences, whereby each of said pulses serves as a color synch pulse.

* * * * *